(12) United States Patent  (10) Patent No.: US 11,351,965 B2
Wu  (45) Date of Patent: Jun. 7, 2022

(54) WINDSHIELD WIPER FRAME

(71) Applicant: Shengzhu Wu, Xiamen (CN)

(72) Inventor: Shengzhu Wu, Xiamen (CN)

( * ) Notice: Subject to any disclaimer, the term of this patent is extended or adjusted under 35 U.S.C. 154(b) by 297 days.

(21) Appl. No.: 16/632,538

(22) PCT Filed: Jun. 1, 2018

(86) PCT No.: PCT/CN2018/089516
§ 371 (c)(1),
(2) Date: Jan. 21, 2020

(87) PCT Pub. No.: WO2019/227461
PCT Pub. Date: Dec. 5, 2019

(65) Prior Publication Data
US 2021/0162952 A1 Jun. 3, 2021

(51) Int. Cl.
*B60S 1/32* (2006.01)
*B60S 1/40* (2006.01)
*B60S 1/38* (2006.01)

(52) U.S. Cl.
CPC . *B60S 1/32* (2013.01); *B60S 1/38* (2013.01); *B60S 1/40* (2013.01)

(58) Field of Classification Search
CPC ................. B60S 1/38; B60S 1/04; B60S 1/40
See application file for complete search history.

(56) References Cited

U.S. PATENT DOCUMENTS

| 3,922,749 | A | * | 12/1975 | Castleman, Jr. | ...... B60S 1/3801 |
| | | | | | 15/250.32 |
| 5,383,249 | A | * | 1/1995 | Yang | ............. B60S 1/3806 |
| | | | | | 15/250.44 |
| 5,802,661 | A | * | 9/1998 | Miller | ............. B60S 1/3801 |
| | | | | | 15/250.361 |
| 5,862,567 | A | * | 1/1999 | Kim | ................... B60S 1/38 |
| | | | | | 15/250.44 |
| 9,333,947 | B2 | * | 5/2016 | Oslizlo | .............. B60S 1/40 |
| 2012/0311808 | A1 | * | 12/2012 | Yang | ............. B60S 1/3801 |
| | | | | | 15/250.32 |
| 2013/0152329 | A1 | * | 6/2013 | Oslizlo | ............. B21D 53/88 |
| | | | | | 15/250.201 |
| 2018/0072273 | A1 | * | 3/2018 | Huertas | .............. B60S 1/38 |

* cited by examiner

*Primary Examiner* — Michael D Jennings
(74) *Attorney, Agent, or Firm* — Leong C. Lei

(57) ABSTRACT

Provided is a windshield wiper frame, including a main frame and two auxiliary frames, wherein the main frame is in the shape of an arch, and the main frame is of an elastic structure; and middle parts of the two auxiliary frames are movably connected to end parts at two ends of the main frame, respectively. When in use, a wiper arm is movably connected to a middle part of the main frame, and a wiper blade is fixed to the auxiliary frames. The windshield wiper frame is beneficial for guaranteeing a wiping effect of the wiper blade.

16 Claims, 10 Drawing Sheets

WINDSHIELD WIPER FRAME

BACKGROUND OF THE INVENTION

1. Field of the Invention

The present invention relates to an automobile part, and more particularly, to a windshield wiper frame.

2. Description of the Prior Art

A windshield wiper is generally composed of a wiper, a wiper arm and a power unit. The wiper includes a wiper frame and a wiper blade fixed on the wiper frame. A conventional wiper frame generally has an arc-shaped elastic steel plate. The wiper arm is hinged to the middle of the wiper frame for adjusting the position of the wiper blade and applying a force to the wiper frame, so that the wiper blade fixed on the wiper frame is closely attached to the windshield of the car. However, this conventional wiper frame does not exert uniform force on the wiper blade. When the wiper arm exerts less force on the middle part of the wiper frame, two ends of the wiper blade are attached to the windshield, while the middle part of the wiper blade cannot be attached to the windshield, so that the wiping effect of the wiper blade is greatly affected.

SUMMARY OF THE INVENTION

The primary object of the present invention is to provide a windshield wiper frame that is beneficial for guaranteeing a wiping effect of a wiper blade.

In order to achieve the above object, the present invention adopts the following technical solutions:

A windshield wiper frame comprises a main frame and two auxiliary frames. The main frame is in the shape of an arch, and the main frame is of an elastic structure. Middle parts of the two auxiliary frames are movably connected to end parts at two ends of the main frame, respectively.

Preferably, each auxiliary frame includes a retaining frame, and a middle part of the retaining frame is movably connected to a corresponding one of the end parts of the main frame.

Preferably, the retaining frame is in the shape of an arch, and the retaining frame is of a rigid structure or an elastic structure.

Preferably, two ends of the retaining frame are provided with retaining parts for retaining a wiper blade.

Preferably, each end part of the main frame is hingedly connected to the middle part of the retaining frame.

Alternatively, each end part of the main frame is movably connected to the middle part of the retaining frame through a buckle. Wherein, each end part of the main frame is formed with a buckle hole, and an underside of the middle part of the retaining frame is formed with an engaging groove. The buckle includes a buckle plate and a base. The base is formed with a first accommodating chamber having two end openings and an elastic plate above the first accommodating chamber. A bottom of the elastic plate is formed with an engaging block. The buckle plate cooperates with a bottom of the base to form a second accommodating chamber having two end openings. One side of the buckle plate is hingedly connected to the base. Another side of the buckle plate is detachably connected to the base through a snap-fit structure. An engaging rib is formed on an inner surface of the buckle plate. Each end part of the main frame is inserted through the first accommodating chamber and is in clearance fit with the first accommodation chamber. The engaging block of the elastic plate is engaged in the buckle hole of the main frame. The middle part of the retaining frame is inserted through the second accommodating chamber and is in clearance fit with the second accommodation chamber. The engaging rib of the buckle plate is engaged in the engaging groove of the retaining frame.

Preferably, each auxiliary frame includes a connecting frame and two retaining frames. A middle part of the connecting frame is movably connected to a corresponding one of the end parts of the main frame. End parts at two ends of the connecting frame of each auxiliary frame are movably connected to middle parts of the two retaining frames of the corresponding auxiliary frame, respectively.

Preferably, the connecting frame is in the shape of an arch, and the connecting frame is of an elastic structure.

Alternatively, the connecting frame is in the shape of an arch, and the connecting frame is of a rigid structure.

Preferably, each retaining frame is in the shape of an arch, and each retaining frame is of a rigid structure or an elastic structure.

Preferably, each end part of the main frame is hingedly connected to the middle part of the connecting frame.

Preferably, the end parts of the connecting frame are hingedly connected to the middle parts of the retaining frames.

Preferably, each end part of the main frame is movably connected to the middle part of the connecting frame through a sleeve. A recess is formed on either side of each end part of the main frame. A connecting notch is formed on either side of the middle part of the connecting frame. The sleeve includes a first sleeve seat. The first sleeve seat is formed with a first through hole and a second through hole under the first through hole. One end of the first sleeve seat is provided with a first elastic pawl for engaging the recess of the main frame and a second elastic pawl for engaging the connecting notch of the connecting frame. Each end part of the main frame is inserted through the first through hole and is in clearance fit with the first through hole. The first elastic pawl is engaged in the recess of the main frame. The connecting frame is inserted through the second through hole and is in clearance fit with the second through hole. The second elastic pawl is engaged in the connecting notch of the connecting frame.

Preferably, the sleeve further includes a second sleeve seat. The second sleeve seat is connected to the first sleeve seat through a connecting plate. The second sleeve seat is formed with a third through hole and a fourth through hole under the third through hole. The third through hole is aligned with the first through hole. The fourth through hole is aligned with the second through hole. Each end part of the main frame is inserted through the third through hole and is in clearance fit with the third through hole. The connecting frame is inserted through the fourth through hole and is in clearance fit with the fourth through hole.

Preferably, each end part of the connecting frame is movably connected to the middle part of a corresponding one of the retaining frames through a buckle. Wherein, each end part of the connecting frame is formed with an engaging hole. An underside of the middle part of each retaining frame is formed with an engaging groove. The buckle includes a buckle plate and a base. The base is formed with a first accommodating chamber having two end openings and an elastic plate above the first accommodating chamber. A bottom of the elastic plate is formed with an engaging block. The buckle plate cooperates with a bottom of the base to form a second accommodating chamber having two end openings. One side of the buckle plate is hingedly connected to the base. Another side of the buckle plate is detachably connected to the base through a snap-fit structure. An engaging rib is formed on an inner surface of the buckle plate. Each end part of the connecting frame is inserted through the first accommodating chamber and is in clearance fit with the first accommodation chamber. The engaging block of the elastic plate of the buckle is engaged in the engaging hole of the connecting frame. The middle part of each retaining frame is inserted through the second accommodating chamber and is in clearance fit with the second accommodation chamber. The engaging rib of the buckle plate of the buckle is engaged in the engaging groove of each retaining frame.

Preferably, two ends of each retaining frame are provided with retaining parts for retaining a wiper blade.

Preferably, the retaining parts are clamping pawls.

Preferably, the middle part of the main frame is provided with a connecting base for connecting a wiper arm.

By adopting the above solutions, when in use, the wiper arm is movably connected to the middle part of the main frame, and the wiper blade is fixed to the auxiliary frame. On the one hand, the middle parts of the two auxiliary frames of the present invention are movably connected to the two end parts of the main frame, respectively. The main frame can uniformly transfer the force from the wiper arm to the auxiliary frames such that the auxiliary frames uniformly apply the force to the wiper blade. On the other hand, the main frame is in the shape of an arch, and the main frame is of an elastic structure. The main frame can correspondingly deform based on the magnitude of the force applied to the main frame by the wiper arm so as to prevent the force transferred to the auxiliary frames from being too much or too little, thus facilitating guaranteeing a wiping effect of the wiper blade.

DETAILED DESCRIPTION OF THE PREFERRED EMBODIMENTS

Figure 1:
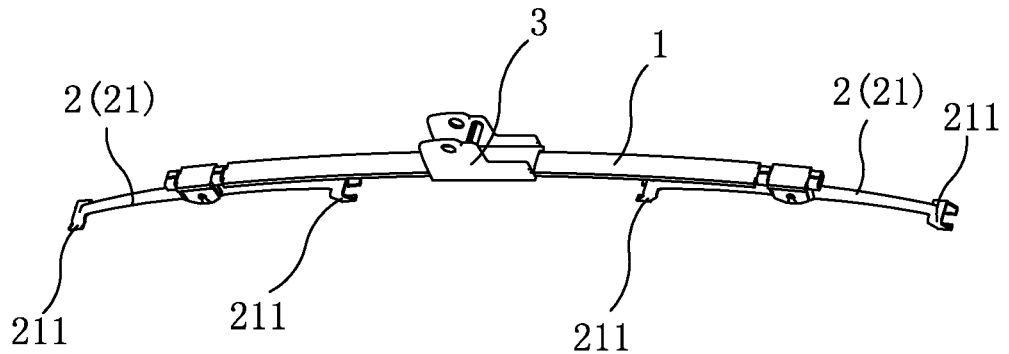
FIG. 1 is a perspective view of the windshield wiper frame according to a first embodiment of the present invention.

Embodiments of the present invention will now be described, by way of example only, with reference to the accompanying drawings.

Embodiment 1

As shown in FIG. 1 through FIG. 4, the present invention discloses a windshield wiper frame, comprising a main frame 1 and two auxiliary frames 2.

Wherein, the main frame 1 is in the shape of an arch, and the main frame 1 is of an elastic structure. The main frame 1 may be made of an elastic steel plate or a flexible plastic material. A middle part of the main frame 1 is provided with a connecting base 3 for connecting the main frame 1 and a wiper arm. Middle parts of the two auxiliary frames 2 are movably connected to end parts at two ends of the main frame 1, respectively. The underside of each auxiliary frame 2 is provided with at least two retaining parts 211 for retaining a wiper blade 6. The retaining part 211 may be a clamping pawl for clamping the wiper blade 6.

In this embodiment, each auxiliary frame 2 includes a retaining frame 21. The retaining frame 21 is in the shape of an arch. The retaining frame 21 is of a rigid structure or an elastic structure. A middle part of the retaining frame 21 is movably connected to a corresponding one of the end parts of the main frame 1. Specifically, in this embodiment, the middle part of the retaining frame 21 is hingedly connected to the corresponding end part of the main frame 1 so as to turn the retaining frame 21 for adjustment. Two ends of the retaining frame 21 are provided with the retaining parts 211. The retaining parts 211 may be integrally formed with the retaining frame 21.

Figure 2:
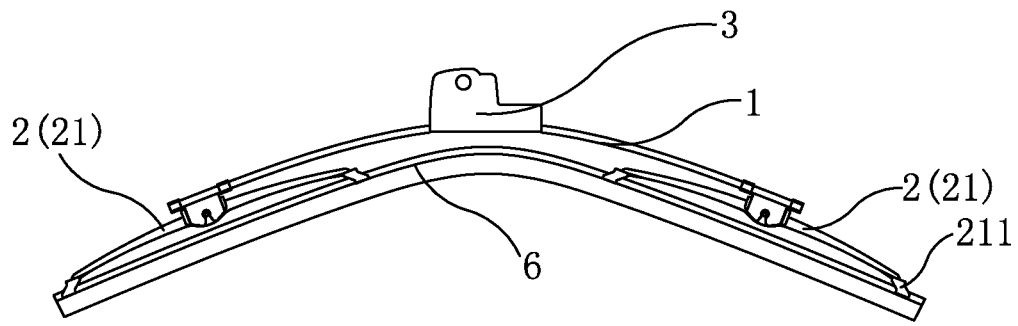
FIG. 2 is a schematic view of the windshield wiper frame fitted with the wiper blade according to the first embodiment of the present invention.
Figure 3:
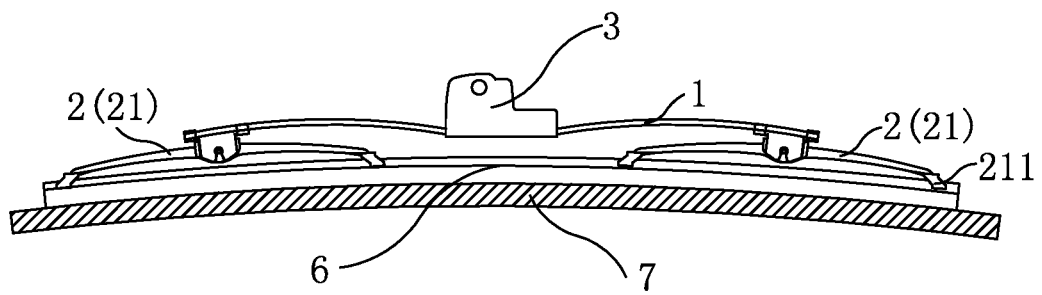
FIG. 3 is a first schematic view of the windshield wiper frame according to the first embodiment of the present invention when in use (the wiper arm exerts a greater force on the main frame)
Figure 4:
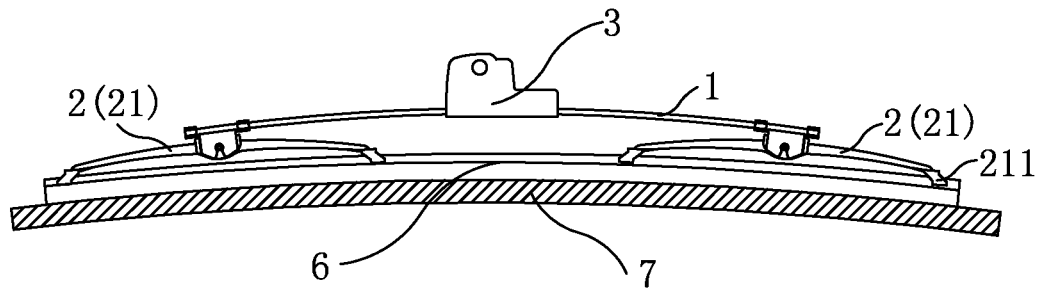
FIG. 4 is a second schematic view of the windshield wiper frame according to the first embodiment of the present invention when in use (the wiper arm exerts a less force on the main frame)

Referring to FIG. 2 to FIG. 4, when the windshield wiper frame of this embodiment is in use, the wiper arm (not shown) is movably connected to the middle part of the main frame 1, and the wiper blade 6 is fixed to the auxiliary frame 2. On the one hand, the middle parts of the two auxiliary frames 2 of the present invention are movably connected to the two end parts of the main frame 1, respectively. The main frame 1 can uniformly transfer the force from the wiper arm to the auxiliary frames 2 such that the auxiliary frames 2 uniformly apply force to the wiper blade 6. On the other hand, the main frame 1 is in the shape of an arch, and the main frame 1 is of an elastic structure. The main frame 1 can correspondingly deform based on the magnitude of the force applied to the main frame 1 by the wiper arm. As shown in FIG. 3, when the force exerted by the wiper arm on the main frame 1 is large, the deformation of the main frame 1 will be large to play a buffering role. This can avoid the excessive force exerted by the wiper arm on the main frame 1 to cause the main frame 1 to transfer too much force to the auxiliary frame 2, so that the auxiliary frame 2 exerts too much force on the wiper blade 6 to cause too much friction between the wiper blade 6 and the windshield 7, making the wiper blade 6 difficult to swing and affecting the wiping effect of the wiper blade 6. As shown in FIG. 4, when the force exerted by the wiper arm on the main frame 1 is small, the deformation of the main frame 1 will be small to avoid the force transferred from the main frame 1 to the auxiliary frame 2 to be too small, so that the auxiliary frame 2 has sufficient force on the wiper blade 6 to ensure that the wiper blade 6 can be attached to the windshield 7, thereby guaranteeing the wiping effect of the wiper blade 6.

Embodiment 2

As shown in FIG. 5 through FIG. 11, the present invention discloses a windshield wiper frame, comprising a main frame 1 and two auxiliary frames 2.

Wherein, the main frame 1 is in the shape of an arch, and the main frame 1 is of an elastic structure. The main frame 1 may be made of an elastic steel plate or a flexible plastic material. A middle part of the main frame 1 is provided with a connecting base 3 for connecting the main frame 1 and a wiper arm. Middle parts of the two auxiliary frames 2 are movably connected to end parts at two ends of the main frame 1, respectively. The underside of each auxiliary frame 2 is provided with at least two retaining parts 211 for retaining a wiper blade 6. The retaining part 211 may be a clamping pawl for clamping the wiper blade 6.

In this embodiment, each auxiliary frame 2 includes a retaining frame 21. The retaining frame 21 is in the shape of an arch. The retaining frame 21 is of a rigid structure or an elastic structure. A middle part of the retaining frame 21 is movably connected to a corresponding one of the end parts of the main frame 1. Two ends of the retaining frame 21 are provided with the retaining parts 211. The retaining parts 211 may be integrally formed with the retaining frame 21.

Figure 8:
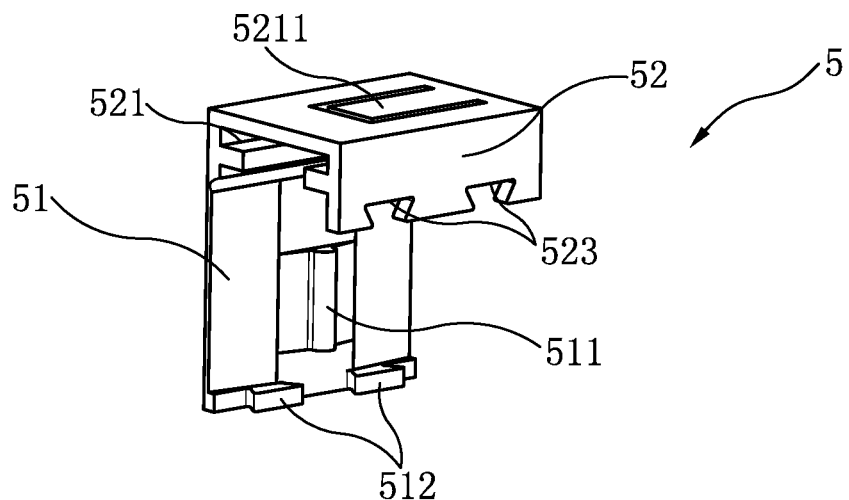
FIG. 8 is a perspective view of the buckle according to the second embodiment of the present invention when the buckle plate and the base are unbuckled.
Figure 9:
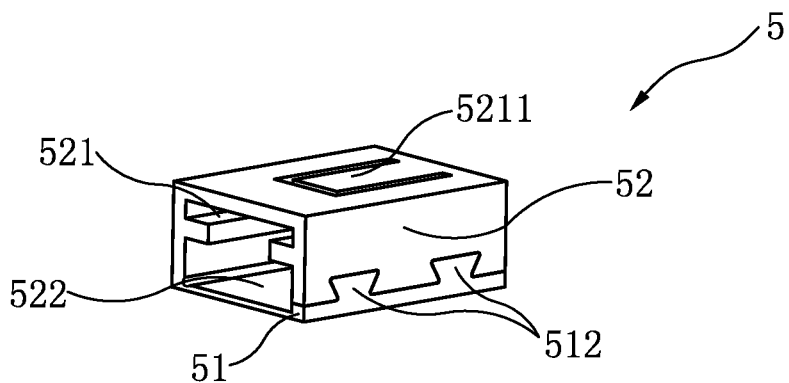
FIG. 9 is a perspective view of the buckle according to the second embodiment of the present invention when the buckle plate and the base are buckled.
Figure 10:
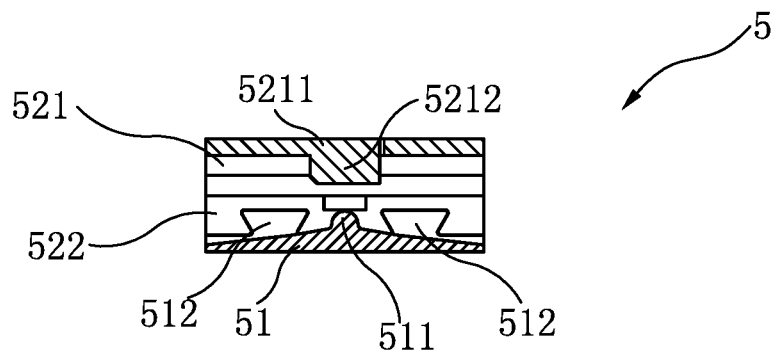
FIG. 10 is a cross-sectional view of the buckle according to the second embodiment of the present invention when the buckle plate and the base are buckled.
Figure 11:
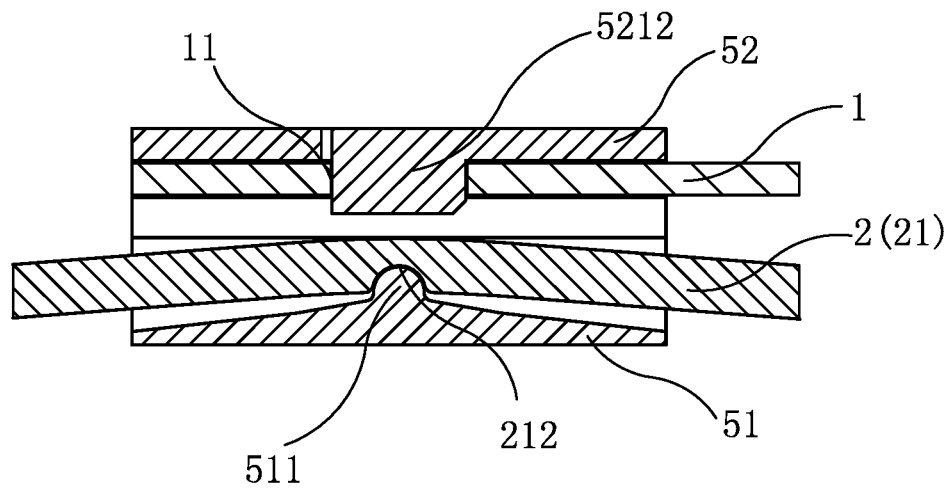
FIG. 11 is a cross-sectional view of the buckle fitted with the main frame and the retaining frame according to the second embodiment of the present invention.

As shown in FIG. 8 to FIG. 11, in this embodiment, the end part of the main frame 1 is movably connected to the middle part of the retaining frame 21 through a buckle 5. Wherein, the end part of the main frame 1 is formed with a buckle hole 11, and the underside of the middle part of the retaining frame 21 is formed with an engaging groove 212. As shown in FIG. 8 to FIG. 10, the buckle 5 includes a buckle plate 51 and a base 52. The base 52 is formed with a first accommodating chamber 521 having two end openings and an elastic plate 5211 above the first accommodating chamber 521. The bottom of the elastic plate 5211 is formed with an engaging block 5212. The buckle plate 51 cooperates with the bottom of the base 52 to form a second accommodating chamber 522 having two end openings. One side of the buckle plate 51 is hingedly connected to the base 52, and the other side of the buckle plate 51 is detachably connected to the base 52 through a snap-fit structure. The snap-fit structure includes a protrusion 512 provided on the other side of the buckle plate 51 and a notch 523 provided on the base 52 for engaging the protrusion 512. An engaging rib 511 is formed on the inner surface of the buckle plate 51. As shown in FIG. 11, the end part of the main frame 1 is inserted through the first accommodating chamber 521 and is in clearance fit with the first accommodation chamber 521. The engaging block 5212 of the elastic plate 5211 is engaged in the buckle hole 11 of the main frame 1. The middle part of the retaining frame 21 is inserted through the second accommodating chamber 522 and is in clearance fit with the second accommodation chamber 522. The engaging rib 511 of the buckle plate 51 is engaged in the engaging groove 212 of the retaining frame 21.

Figure 5:
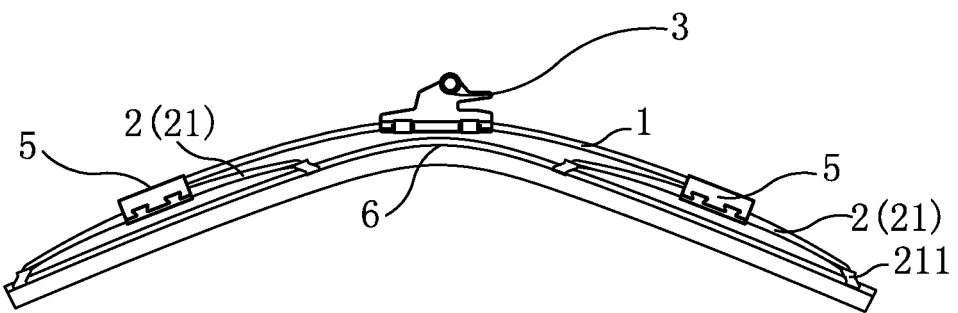
FIG. 5 is a schematic view of the windshield wiper frame fitted with the wiper blade according to a second embodiment of the present invention.
Figure 6:
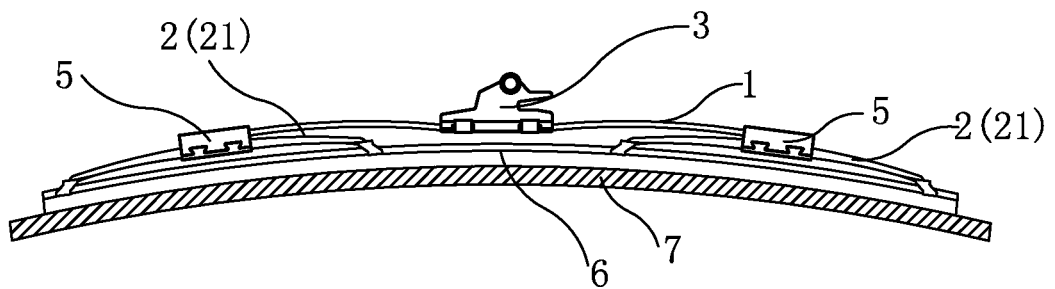
FIG. 6 is a first schematic view of the windshield wiper frame according to the second embodiment of the present invention when in use (the wiper arm exerts a greater force on the main frame)
Figure 7:
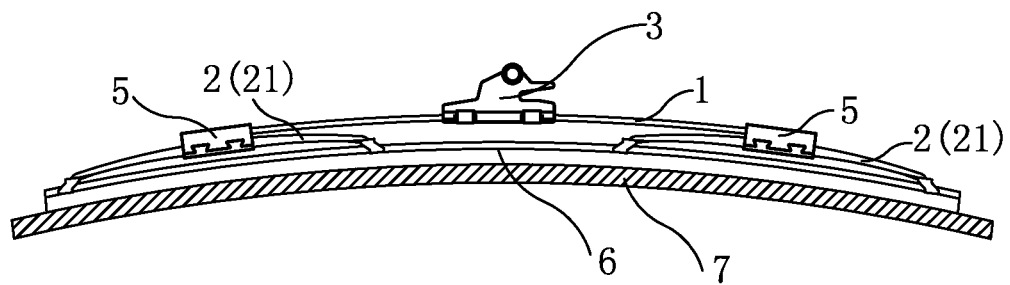
FIG. 7 is a second schematic view of the windshield wiper frame according to the second embodiment of the present invention when in use (the wiper arm exerts a less force on the main frame)

Referring to FIG. 5 to FIG. 7, when the windshield wiper frame of this embodiment is in use, the wiper arm (not shown) is movably connected to the middle part of the main frame 1, and the wiper blade 6 is fixed to the auxiliary frame 2. As shown in FIG. 6, when the force exerted by the wiper arm on the main frame 1 is large, the deformation of the main frame 1 will be large to play a buffering role. This can avoid the excessive force exerted by the wiper arm on the main frame 1 to cause the main frame 1 to transfer too much force to the auxiliary frame 2, so that the auxiliary frame 2 exerts too much force on the wiper blade 6 to cause too much friction between the wiper blade 6 and the windshield 7, making the wiper blade 6 difficult to swing and affecting the wiping effect of the wiper blade 6. As shown in FIG. 7, when the force exerted by the wiper arm on the main frame 1 is small, the deformation of the main frame 1 will be small to avoid the force transferred from the main frame 1 to the auxiliary frame 2 to be too small, so that the auxiliary frame 2 have sufficient force on the wiper blade to ensure that the wiper blade 6 can be attached to the windshield 7, thereby guaranteeing the wiping effect of the wiper blade 6.

Embodiment 3

Figure 12:
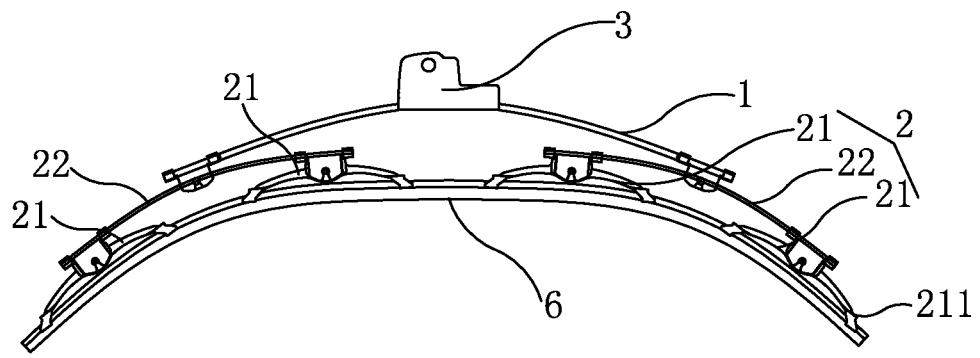
FIG. 12 is a schematic view of the windshield wiper frame fitted with the wiper blade according to a third embodiment of the present invention.
Figure 13:
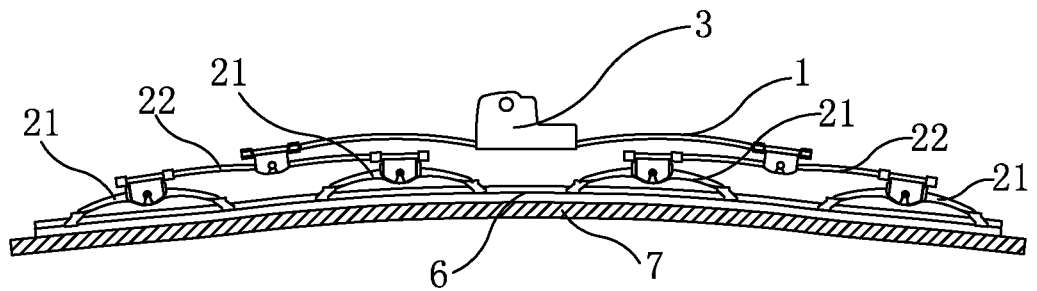
FIG. 13 is a first schematic view of the windshield wiper frame according to the third embodiment of the present invention when in use (the wiper arm exerts a greater force on the main frame)
Figure 14:
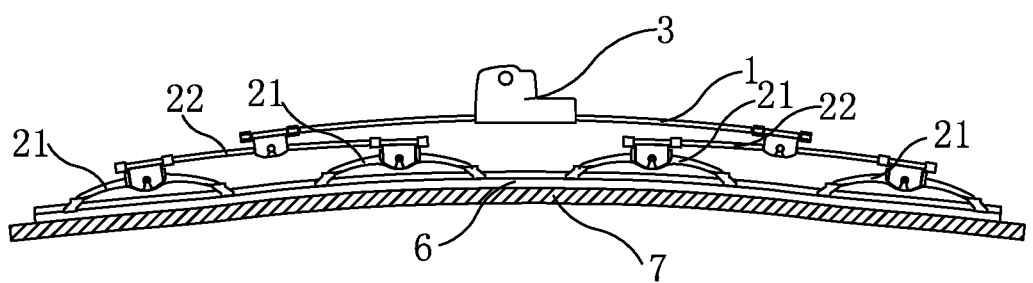
FIG. 14 is a second schematic view of the windshield wiper frame according to the third embodiment of the present invention when in use (the wiper arm exerts a less force on the main frame)

As shown in FIG. 12 through FIG. 14, the present invention discloses a windshield wiper frame, comprising a main frame 1 and two auxiliary frames 2.

Wherein, the main frame 1 is in the shape of an arch, and the main frame 1 is of an elastic structure. The main frame 1 may be made of an elastic steel plate or a flexible plastic material. A middle part of the main frame 1 is provided with a connecting base 3 for connecting the main frame 1 and a wiper arm. Middle parts of the two auxiliary frames 2 are movably connected to end parts at two ends of the main frame 1, respectively. The underside of each auxiliary frame 2 is provided with at least two retaining parts 211 for retaining a wiper blade 6. The retaining part 211 may be a clamping pawl for clamping the wiper blade 6.

In this embodiment, each auxiliary frame 2 includes a connecting frame 22 and two retaining frames 21. Each of the connecting frame 22 and the retaining frames 21 is in the shape of an arch. A middle part of the connecting frame 22 is movably connected to a corresponding one of the end parts of the main frame 1. End parts at two ends of the connecting frame 22 of each auxiliary frame 2 are movably connected to the middle parts of the two retaining frames 21 of the auxiliary frame 2, respectively. Two ends of the retaining frame 21 are provided with the retaining parts 211. The connecting frame 22 is of an elastic structure, so as to avoid that the force transferred to the retaining frame 21 is too large or too small. The retaining frame 21 may be of a rigid structure to ensure its retaining effect on the wiper blade 6. The retaining frame 21 may be of an elastic structure to ensure that the force applied to the wiper blade 6 is stable.

In this embodiment, the end part of the main frame 1 is hingedly connected to the middle part of the connecting frame 22, and the end part of the connecting frame 22 is hingedly connected to the middle part of the retaining frame 21. In this way, the connecting frame 22 and the retaining frame 21 can be turned for adjustment.

Referring to FIG. 12 to FIG. 14, when the windshield wiper frame of this embodiment is in use, the wiper arm (not shown) is movably connected to the middle part of the main frame 1, and the wiper blade 6 is fixed to the retaining frame 21 of the auxiliary frame 2. As shown in FIG. 13, when the force exerted by the wiper arm on the main frame 1 is large, the deformation of the main frame 1 and the connecting frame 22 will be large to play a buffering role. This can avoid the excessive force exerted by the wiper arm on the main frame 1 to cause the main frame 1 to transfer too much force to the auxiliary frame 2, so that the retaining frame 21 exerts too much force on the wiper blade 6 to cause too much friction between the wiper blade 6 and the windshield 7, making the wiper blade 6 difficult to swing and affecting the wiping effect of the wiper blade 6. As shown in FIG. 14, when the force exerted by the wiper arm on the main frame 1 is small, the deformation of the main frame 1 and the connecting frame 22 will be small to avoid the force transferred to the retaining frame 21 to be too small, so that the retaining frame 21 has sufficient force on the wiper blade 6 to ensure that the wiper blade 6 can be attached to the windshield 7, thereby guaranteeing the wiping effect of the wiper blade 6.

Embodiment 4

As shown in FIG. 15 through FIG. 27, the present invention discloses a windshield wiper frame, comprising a main frame 1 and two auxiliary frames 2.

Wherein, the main frame 1 is in the shape of an arch, and the main frame 1 is of an elastic structure. The main frame 1 may be made of an elastic steel plate or a flexible plastic material. A middle part of the main frame 1 is provided with a connecting base 3 for connecting the main frame 1 and a wiper arm. Middle parts of the two auxiliary frames 2 are movably connected to end parts at two ends of the main frame 1, respectively. The underside of each auxiliary frame 2 is provided with at least two retaining parts 211 for retaining a wiper blade 6. The retaining part 211 may be a clamping pawl for clamping the wiper blade 6.

In this embodiment, each auxiliary frame 2 includes a connecting frame 22 and two retaining frames 21. Each of the connecting frame 22 and the retaining frames 21 is in the shape of an arch. A middle part of the connecting frame 22 is movably connected to a corresponding one of the end parts of the main frame 1. End parts at two ends of the connecting frame 22 of each auxiliary frame 2 are movably connected to the middle parts of the two retaining frames 21 of the auxiliary frame 2, respectively. Two ends of the retaining frame 21 are provided with the retaining parts 211. The connecting frame 22 is of an elastic structure, so as to avoid that the force transferred to the retaining frame 21 is too large or too small. The retaining frame 21 may be of a rigid structure to ensure its retaining effect on the wiper blade 6. The retaining frame 21 may be of an elastic structure to ensure that the force applied to the wiper blade 6 is stable.

As shown in FIG. 15 to FIG. 23, in this embodiment, the end part of the main frame 1 is movably connected to the middle part of the connecting frame 22 through a sleeve 4. Wherein, a recess 12 is formed on either side of the end part of the main frame 1. A connecting notch 221 is formed on either side of the middle part of the connecting frame 22. The sleeve 4 includes a first sleeve seat 41. The first sleeve seat 41 is formed with a first through hole 411 and a second through hole 412 under the first through hole 411. One end of the first sleeve seat 41 is provided with a first elastic pawl 413 for engaging the recess 12 of the main frame 1 and a second elastic pawl 414 for engaging the connecting notch 221 of the connecting frame 22. The end part of the main frame 1 is inserted through the first through hole 411 and is in clearance fit with the first through hole 411. The first elastic pawl 413 is engaged in the recess 12 of the main frame 1. The connecting frame 22 is inserted through the second through hole 412 and is in clearance fit with the second through hole 412. The second elastic pawl 414 is engaged in the connecting notch 221 of the connecting frame 22.

Furthermore, as shown in FIG. 15 to FIG. 23, the sleeve 4 further includes a second sleeve seat 42. The second sleeve seat 42 is connected to the first sleeve seat 41 through a connecting plate 43. The second sleeve seat 42 is formed with a third through hole 421 and a fourth through hole 422 under the third through hole 421. The third through hole 421 is aligned with the first through hole 411, and the fourth through hole 422 is aligned with the second through hole 412. The end part of the main frame 1 is inserted through the third through hole 421 and is in clearance fit with the third through hole 421. The connecting frame 22 is inserted through the fourth through hole 422 and is in clearance fit with the fourth through hole 422.

Figure 25:
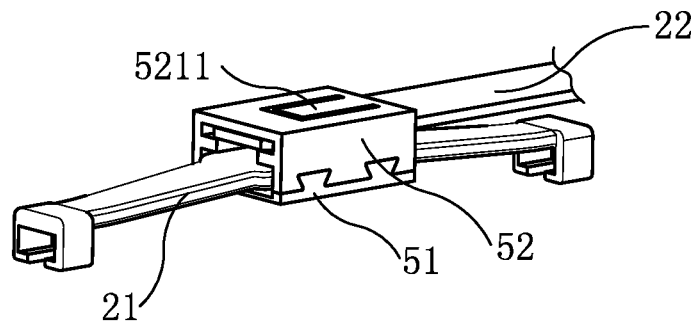
FIG. 25 is a first schematic view of the buckle fitted with the connecting frame and the retaining frame according to the fourth embodiment of the present invention.
Figure 26:
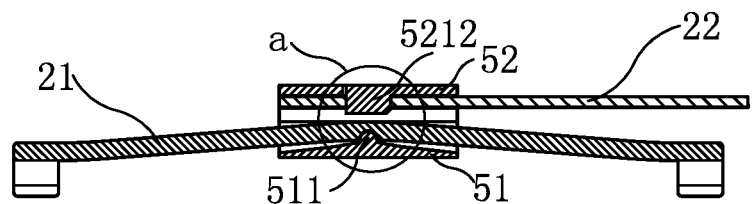
FIG. 26 is a second schematic view of the buckle fitted with the connecting frame and the retaining frame according to the fourth embodiment of the present invention.
Figure 27:
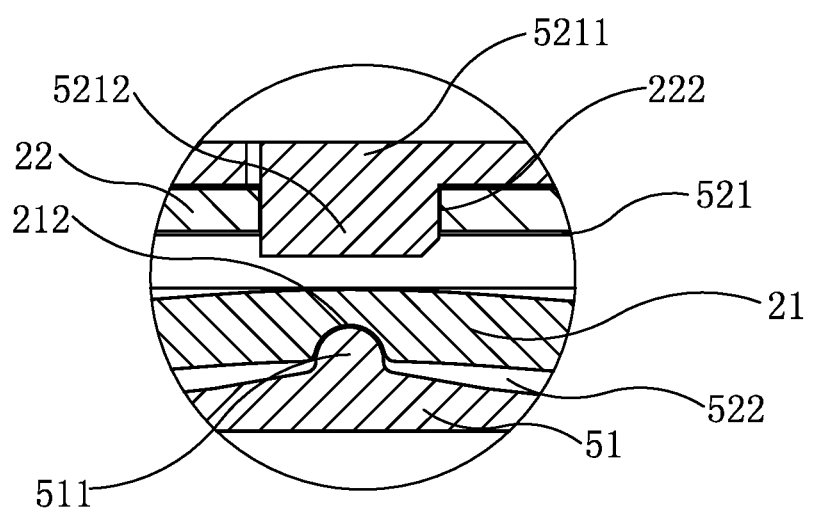
FIG. 27 is an enlarged view of circle a of FIG. 26.
Figure 28:
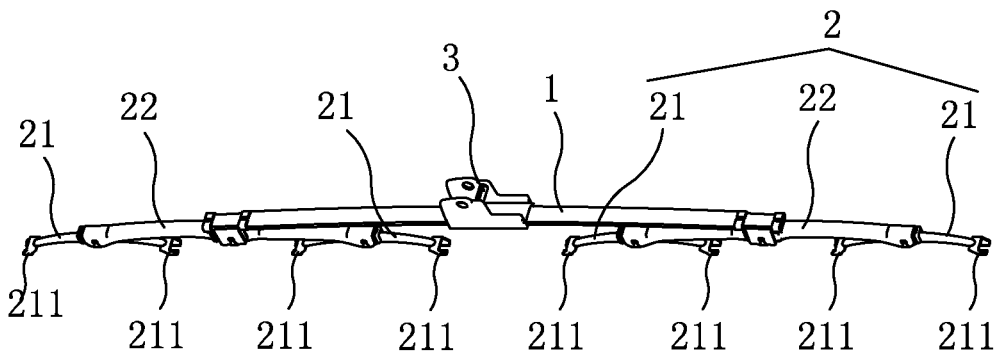
FIG. 28 is a perspective view of the windshield wiper frame according to a fifth embodiment of the present invention.

In this embodiment, the end part of the connecting frame 2 is movably connected to the middle part of the retaining frame 21 through a buckle 5. Referring to FIG. 24 to FIG. 27, the end part of the connecting frame 22 is formed with an engaging hole 222, and the underside of the middle part of the retaining frame 21 is formed with an engaging groove 212. As shown in FIG. 8 to FIG. 10, the buckle 5 includes a buckle plate 51 and a base 52. The base 52 is formed with a first accommodating chamber 521 having two end openings and an elastic plate 5211 above the first accommodating chamber 521. The bottom of the elastic plate 5211 is formed with an engaging block 5212. The buckle plate 51 cooperates with the bottom of the base 52 to form a second accommodating chamber 522 having two end openings. One side of the buckle plate 51 is hingedly connected to the base 52, and the other side of the buckle plate 51 is detachably connected to the base 52 through a snap-fit structure. The snap-fit structure includes a protrusion 512 provided on the other side of the buckle plate 51 and a notch 523 provided on the base 52 for engaging the protrusion 512. An engaging rib 511 is formed on the inner surface of the buckle plate 51. Referring to FIG. 25 to FIG. 27, the end part of the connecting frame 22 is inserted through the first accommodating chamber 521 and is in clearance fit with the first accommodation chamber 521. The engaging block 5212 of the elastic plate 5211 of the buckle 5 is engaged in the engaging hole 222 of the connecting frame 22. The middle part of the retaining frame 21 is inserted through the second accommodating chamber 522 and is in clearance fit with the second accommodation chamber 522. The engaging rib 511 of the buckle plate 51 of the buckle 5 is engaged in the engaging groove 212 of the retaining frame 21.

Figure 15:
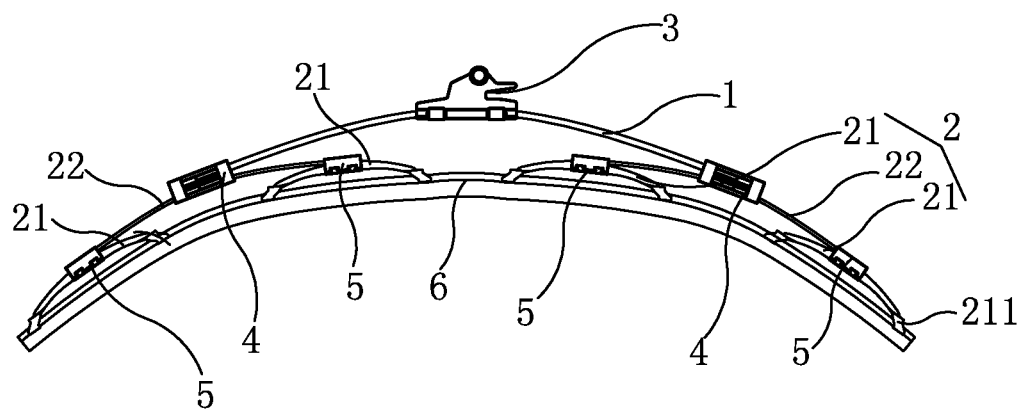
FIG. 15 is a schematic view of the windshield wiper frame fitted with the wiper blade according to a fourth embodiment of the present invention.
Figure 16:
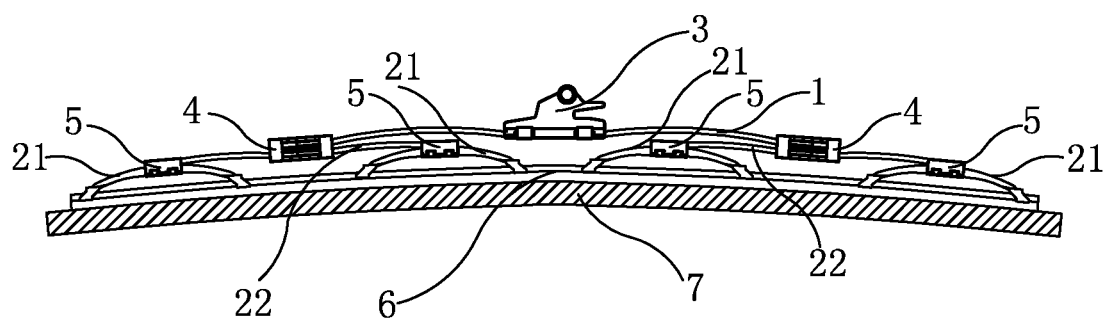
FIG. 16 is a first schematic view of the windshield wiper frame according to the fourth embodiment of the present invention when in use (the wiper arm exerts a greater force on the main frame)
Figure 17:
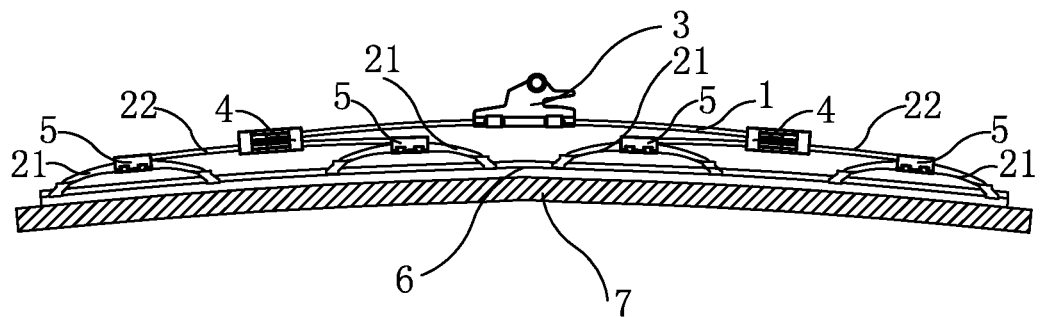
FIG. 17 is a second schematic view of the windshield wiper frame according to the fourth embodiment of the present invention when in use (the wiper arm exerts a less force on the main frame)
Figure 18:
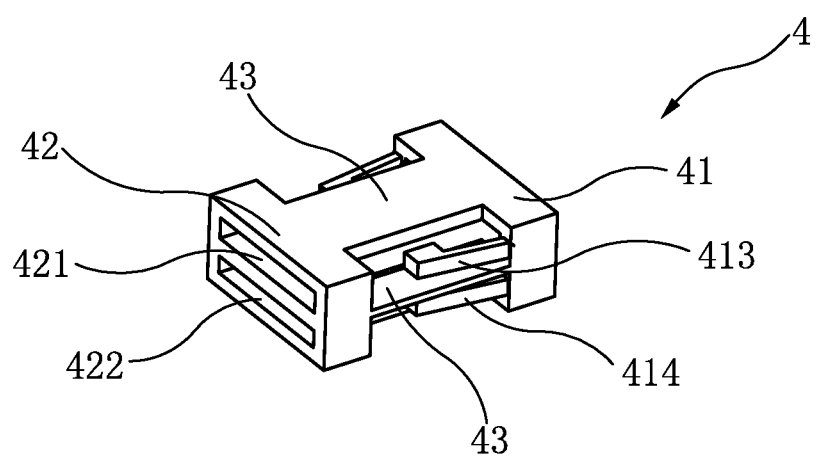
FIG. 18 is a perspective view of the sleeve according to the fourth embodiment of the present invention.
Figure 19:
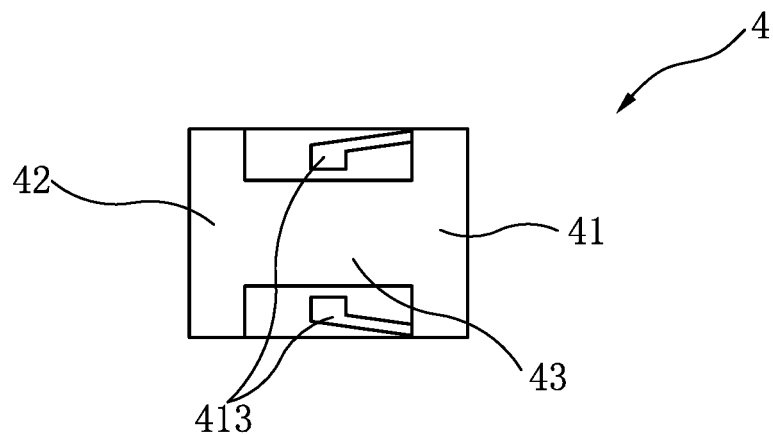
FIG. 19 is a top view of the sleeve according to the fourth embodiment of the present invention.
Figure 20:
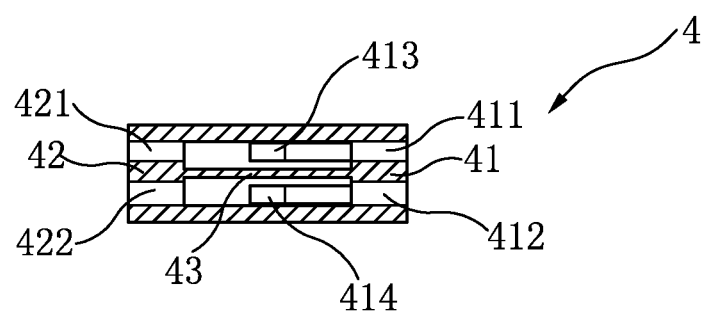
FIG. 20 is a cross-sectional view of the sleeve according to the fourth embodiment of the present invention.
Figure 21:
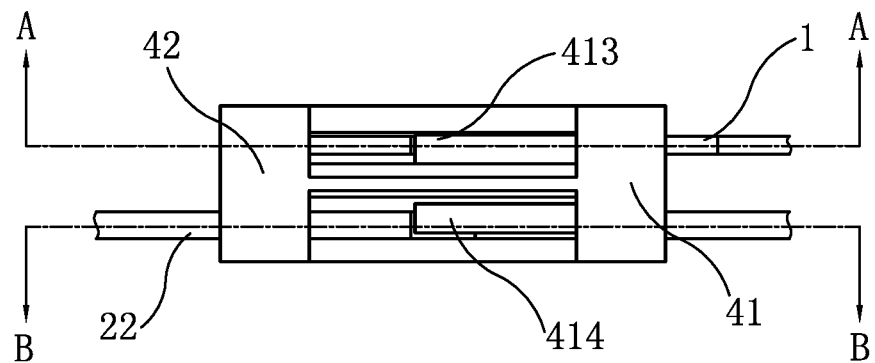
FIG. 21 is a schematic view of the sleeve fitted with the main frame and the connecting frame according to the fourth embodiment of the present invention.
Figure 22:
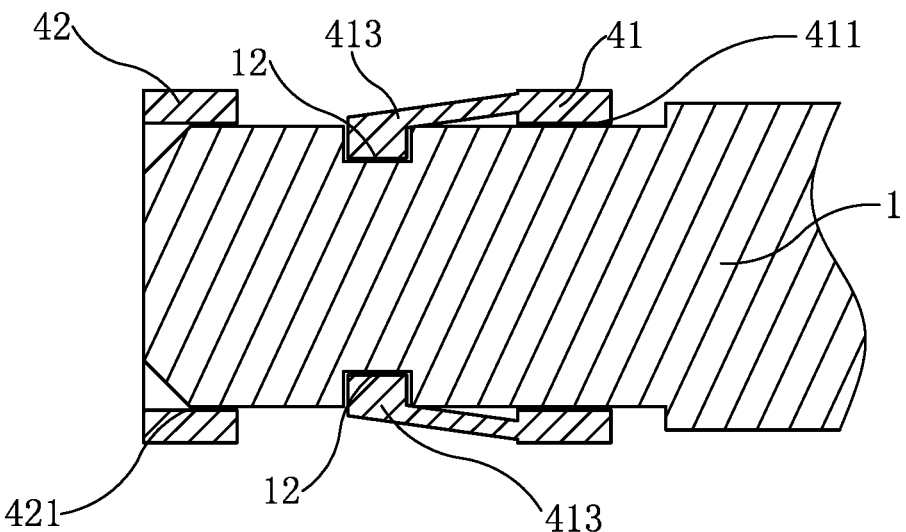
FIG. 22 is a cross-sectional view taken along line A-A of FIG. 21.
Figure 23:
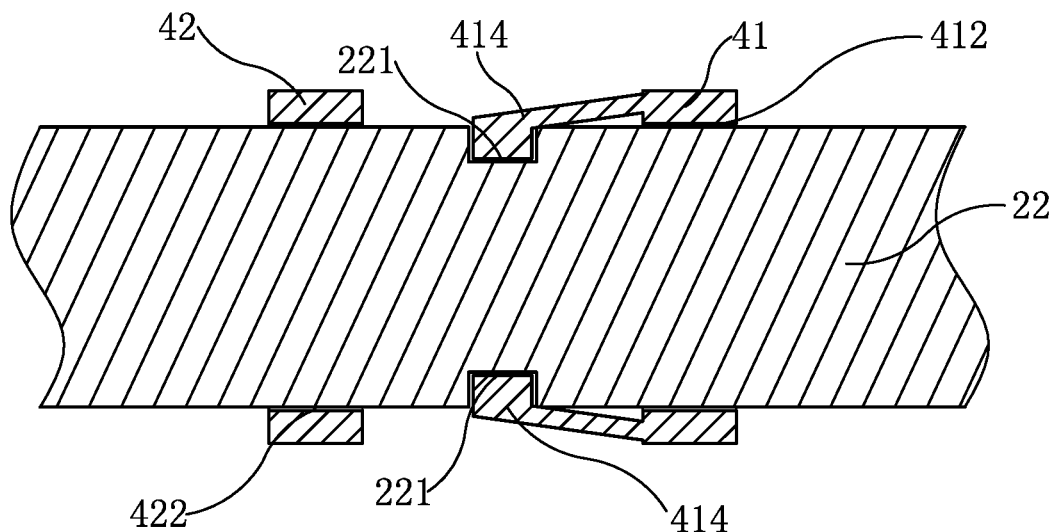
FIG. 23 is a cross-sectional view taken along line B-B of FIG. 21.
Figure 24:
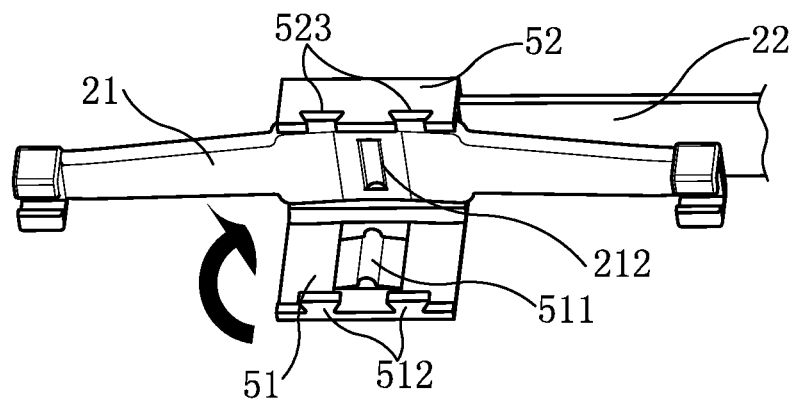
FIG. 24 is a schematic view of the buckle fitted with the retaining frame according to the fourth embodiment of the present invention.

Referring to FIG. 15 to FIG. 17, when the windshield wiper frame of this embodiment is in use, the wiper arm (not shown) is movably connected to the middle part of the main frame 1, and the wiper blade 6 is fixed to the retaining frame 21 of the auxiliary frame 2. As shown in FIG. 16, when the force exerted by the wiper arm on the main frame 1 is large, the deformation of the main frame 1 and the connecting frame 22 will be large to play a buffering role. This can avoid the excessive force exerted by the wiper arm on the main frame 1 to cause the main frame 1 to transfer too much force to the auxiliary frame 2, so that the retaining frame 21 exerts too much force on the wiper blade 6 to cause too much friction between the wiper blade 6 and the windshield 7, making the wiper blade 6 difficult to swing and affecting the wiping effect of the wiper blade 6. As shown in FIG. 17, when the force exerted by the wiper arm on the main frame 1 is small, the deformation of the main frame 1 and the connecting frame 22 will be small to avoid the force transferred to the retaining frame 21 to be too small, so that the retaining frame 21 has sufficient force on the wiper blade 6 to ensure that the wiper blade 6 can be attached to the windshield 7, thereby guaranteeing the wiping effect of the wiper blade 6.

Embodiment 5

As shown in FIG. 28 through FIG. 31, the present invention discloses a windshield wiper frame, comprising a main frame 1 and two auxiliary frames 2.

Wherein, the main frame 1 is in the shape of an arch, and the main frame 1 is of an elastic structure. The main frame 1 may be made of an elastic steel plate or a flexible plastic material. A middle part of the main frame 1 is provided with a connecting base 3 for connecting the main frame 1 and a wiper arm. Middle parts of the two auxiliary frames 2 are movably connected to end parts at two ends of the main frame 1, respectively. The underside of each auxiliary frame 2 is provided with at least two retaining parts 211 for retaining a wiper blade 6. The retaining part 211 may be a clamping pawl for clamping the wiper blade 6.

In this embodiment, each auxiliary frame 2 includes a connecting frame 22 and two retaining frames 21. Each of the connecting frame 22 and the retaining frames 21 is in the shape of an arch. A middle part of the connecting frame 22 is movably connected to a corresponding one of the end parts of the main frame 1. End parts at two ends of the connecting frame 22 of each auxiliary frame 2 are movably connected to the middle parts of the two retaining frames 21 of the auxiliary frame 2, respectively. Two ends of the retaining frame 21 are provided with the retaining parts 211. The connecting frame 22 may be of a rigid structure to enhance the overall strength of the present invention. The retaining frame 21 may be of a rigid structure to ensure its retaining effect on the wiper blade 6. The retaining frame 21 may be of an elastic structure to ensure that the force applied to the wiper blade 6 is stable.

In this embodiment, the end part of the main frame 1 is hingedly connected to the middle part of the connecting frame 22, and the end part of the connecting frame 22 is hingedly connected to the middle part of the retaining frame 21. In this way, the connecting frame 22 and the retaining frame 21 can be turned for adjustment.

Figure 29:
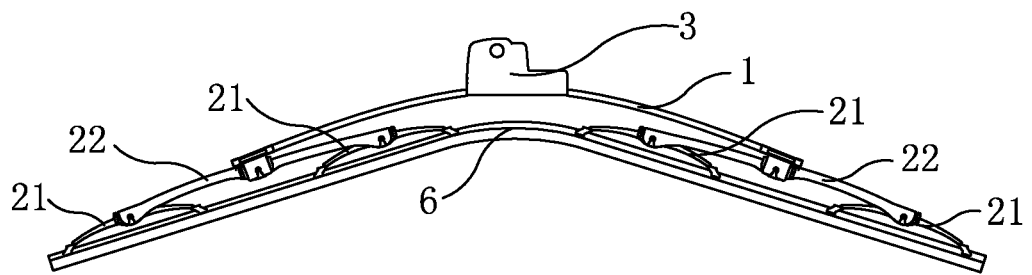
FIG. 29 is a schematic view of the windshield wiper frame fitted with the wiper blade according to the fifth embodiment of the present invention.
Figure 30:
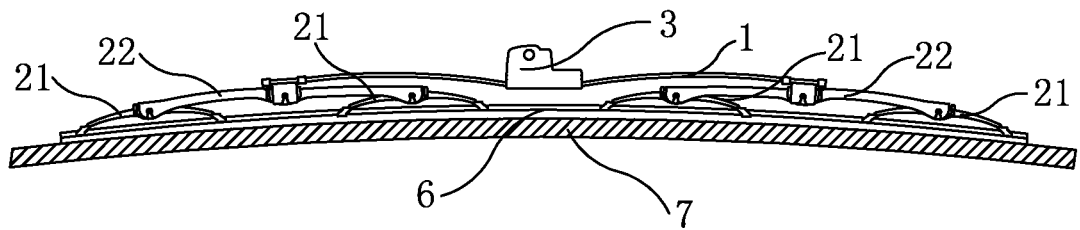
FIG. 30 is a first schematic view of the windshield wiper frame according to the fifth embodiment of the present invention when in use (the wiper arm exerts a greater force on the main frame)
Figure 31:
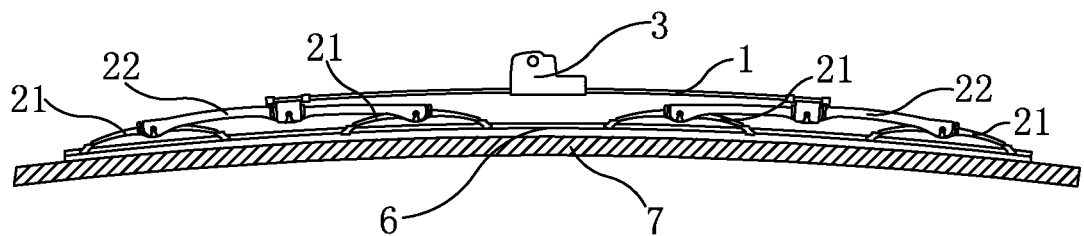
FIG. 31 is a second schematic view of the windshield wiper frame according to the fifth embodiment of the present invention when in use (the wiper arm exerts a less force on the main frame).

Referring to FIG. 29 to FIG. 31, when the windshield wiper frame of this embodiment is in use, the wiper arm (not shown) is movably connected to the middle part of the main frame 1, and the wiper blade 6 is fixed to the retaining frame 21 of the auxiliary frame 2. As shown in FIG. 30, when the force exerted by the wiper arm on the main frame 1 is large, the deformation of the main frame 1 will be large to play a buffering role. This can avoid the excessive force exerted by the wiper arm on the main frame 1 to cause the main frame 1 to transfer too much force to the auxiliary frame 2, so that the retaining frame 21 exerts too much force on the wiper blade 6 to cause too much friction between the wiper blade 6 and the windshield 7, making the wiper blade 6 difficult to swing and affecting the wiping effect of the wiper blade 6. As shown in FIG. 31, when the force exerted by the wiper arm on the main frame 1 is small, the deformation of the main frame 1 will be small to avoid the force transferred from the main frame 1 to the connecting frame 22 to be too small, which causes the force transferred from the connecting frame 22 to the retaining frame 21 to be too small, so that the retaining frame 22 have sufficient force on the wiper blade 6 to ensure that the wiper blade 6 can be attached to the windshield 7, thereby guaranteeing the wiping effect of the wiper blade 6.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A windshield wiper frame, comprising a main frame and two auxiliary frames, the main frame being in the shape of an arch, the main frame being of an elastic structure; middle parts of the two auxiliary frames being movably connected to end parts at two ends of the main frame, respectively; wherein each auxiliary frame includes a retaining frame, and a middle part of the retaining frame is movably connected to a corresponding one of the end parts of the main frame;

wherein each end part of the main frame is movably connected to the middle part of the retaining frame through a buckle;

wherein each end part of the main frame is formed with a buckle hole, and an underside of the middle part of the retaining frame is formed with an engaging groove;

wherein the buckle includes a buckle plate and a base; the base is formed with a first accommodating chamber having two end openings and an elastic plate above the first accommodating chamber, a bottom of the elastic plate is formed with an engaging block; the buckle plate cooperates with a bottom of the base to form a second accommodating chamber having two end openings, one side of the buckle plate is hingedly connected to the base, another side of the buckle plate is detachably connected to the base through a snap-fit structure, an engaging rib is formed on an inner surface of the buckle plate;

wherein each end part of the main frame is inserted through the first accommodating chamber and is in clearance fit with the first accommodation chamber, the engaging block of the elastic plate is engaged in the buckle hole of the main frame; and wherein the middle part of the retaining frame is inserted through the second accommodating chamber and is in clearance fit with the second accommodation chamber, and the engaging rib of the buckle plate is engaged in the engaging groove of the retaining frame.

2. The windshield wiper frame as claimed in claim 1, wherein the retaining frame is in the shape of an arch, and the retaining frame is of a rigid structure or an elastic structure.

3. The windshield wiper frame as claimed in claim 1, wherein two ends of the retaining frame are provided with retaining parts for retaining a wiper blade.

4. The windshield wiper frame as claimed in claim 1, wherein each end part of the main frame is hingedly connected to the middle part of the retaining frame.

5. The windshield wiper frame as claimed in claim 1, wherein each auxiliary frame includes a connecting frame and two retaining frames; a middle part of the connecting frame is movably connected to a corresponding one of the end parts of the main frame, and end parts at two ends of the connecting frame of each auxiliary frame are movably connected to middle parts of the two retaining frames of the corresponding auxiliary frame, respectively.

6. The windshield wiper frame as claimed in claim 5, wherein the connecting frame is in the shape of an arch, and the connecting frame is of an elastic structure.

7. The windshield wiper frame as claimed in claim 5, wherein the connecting frame is in the shape of an arch, and the connecting frame is of a rigid structure.

8. The windshield wiper frame as claimed in claim 6 or 7, wherein the end parts of the connecting frame are hingedly connected to the middle parts of the retaining frames.

9. The windshield wiper frame as claimed in claim 6, wherein each end part of the main frame is movably connected to the middle part of the connecting frame through a sleeve;

a recess is formed on either side of each end part of the main frame; a connecting notch is formed on either side of the middle part of the connecting frame;

the sleeve includes a first sleeve seat, the first sleeve seat is formed with a first through hole and a second through hole under the first through hole; one end of the first sleeve seat is provided with a first elastic pawl for engaging the recess of the main frame and a second elastic pawl for engaging the connecting notch of the connecting frame;

each end part of the main frame is inserted through the first through hole and is in clearance fit with the first through hole, the first elastic pawl is engaged in the recess of the main frame; the connecting frame is inserted through the second through hole and is in clearance fit with the second through hole, and the second elastic pawl is engaged in the connecting notch of the connecting frame.

10. The windshield wiper frame as claimed in claim 9, wherein the sleeve further includes a second sleeve seat, the second sleeve seat is connected to the first sleeve seat through a connecting plate; the second sleeve seat is formed with a third through hole and a fourth through hole under the third through hole, the third through hole is aligned with the first through hole, the fourth through hole is aligned with the second through hole; each end part of the main frame is inserted through the third through hole and is in clearance fit with the third through hole; and the connecting frame is inserted through the fourth through hole and is in clearance fit with the fourth through hole.

11. The windshield wiper frame as claimed in claim 9, wherein each end part of the connecting frame is movably connected to the middle part of a corresponding one of the retaining frames through a buckle;

each end part of the connecting frame is formed with an engaging hole, and an underside of the middle part of each retaining frame is formed with an engaging groove;

the buckle includes a buckle plate and a base; the base is formed with a first accommodating chamber having two end openings and an elastic plate above the first accommodating chamber, a bottom of the elastic plate is formed with an engaging block; the buckle plate cooperates with a bottom of the base to form a second accommodating chamber having two end openings, one side of the buckle plate is hingedly connected to the base, another side of the buckle plate is detachably connected to the base through a snap-fit structure, an engaging rib is formed on an inner surface of the buckle plate;

each end part of the connecting frame is inserted through the first accommodating chamber and is in clearance fit with the first accommodation chamber, the engaging block of the elastic plate of the buckle is engaged in the engaging hole of the connecting frame;

the middle part of each retaining frame is inserted through the second accommodating chamber and is in clearance fit with the second accommodation chamber, the engaging rib of the buckle plate of the buckle is engaged in the engaging groove of each retaining frame.

12. The windshield wiper frame as claimed in claim 6 or 7, wherein each end part of the main frame is hingedly connected to the middle part of the connecting frame.

13. The windshield wiper frame as claimed in claim 5, wherein each retaining frame is in the shape of an arch, and each retaining frame is of a rigid structure or an elastic structure.

14. The windshield wiper frame as claimed in claim 5, wherein two ends of each retaining frame are provided with retaining parts for retaining a wiper blade.

15. The windshield wiper frame as claimed in claim 3 or 14, wherein the retaining parts are clamping pawls.

16. The windshield wiper frame as claimed in claim 1, wherein the middle part of the main frame is provided with a connecting base for connecting a wiper arm.

\* \* \* \* \*